3,232,897
ADHESIVE COMPOSITION COMPRISING RESORCINOL-FORMALDEHYDE CONDENSATE AND ALKALI BARK DERIVATIVE
Franklin W. Herrick, Shelton, Wash., and Louis H. Bock, Vancouver, British Columbia, Canada, assignors to Rayonier Incorporated, Shelton, Wash., a corporation of Delaware
No Drawing. Filed Mar. 20, 1961, Ser. No. 96,708
5 Claims. (Cl. 260—29.3)

This invention relates to resorcinol-formaldehyde cold-setting adhesive resins, and has for its object the provision of an improved adhesive base for forming such adhesive resins and an improved adhesive resin of this type. This invention is based on our discovery that resorcinol-formaldehyde adhesive bases can be formed by incorporating in a particular resorcinol-formaldehyde resin an alkali bark derivative of coniferous tree barks with a resulting reduction in the cost of the adhesive base and adhesive, and certain improvements in their properties.

The resorcinol-formaldehyde cold-setting adhesive bases now in commercial use comprise a carefully prepared resorcinol-formaldehyde, or a resorcinol-phenol-formaldehyde, condensate syrup or adhesive base of suitable viscosity in which the mole ratio of formaldehyde to phenolic material (resorcinol and/or phenol) ranges from 0.5 to 0.8. While considerable care is required in condensing the mixture to obtain a suitable viscosity without going too far, the desired product is quite stable and can be stored indefinitely, i.e., it has good "shelf life." It is also common practice to add a stabilizer, for example, a mixture of methanol and water in equal parts, to improve the "pot life" of the adhesive formed therefrom. When it is desired to form the adhesive for use, the condensate syrup or adhesive base is mixed with a hardener, usually paraformaldehyde, and a filler such as walnut shell flour. After the hardener is mixed into the adhesive base, the "pot life" of the adhesive (the time it takes to gel) as contrasted with the "shelf life" of the adhesive base is relatively short, normally ranging from about 1 to 4 hours. "Pot life" is affected by a number of factors, among which are pH, the initial viscosity of the adhesive base and the amount and kind of stabilizer used. Each of these factors must be carefully controlled.

When such cold-setting adhesive resins are applied to plywood they can be set by compressing the plywood at pressures as low as 30 to 40 pounds per square inch. The adhesive, at room temperature, will set up (cure) in from 4 to 18 hours, forming excellent waterproof joints of great strength. Since low pressures and temperatures can be used, adhesives of the cold-setting type have many important uses, where heating and pressing are a problem and very strong waterproof joints are a necessity.

We have discovered that an alkali bark derivative of coniferous barks having formaldehyde reactivities of over 5% can be incorporated into a resorcinol-formaldehyde resin having a ratio of 0.5 to 0.8 of formaldehyde to resorcinol in an aqueous solution, the ratio of resorcinol-formaldehyde to alkali bark derivative being from 0.5 to 4, forming an adhesive base which as good shelf life and which, when combined with an aldehyde hardener, forms a cold-setting adhesive resin. The bark derivative lessens the need for such careful control of the viscosity of the adhesive base of usual composition, and the "shelf life" is not impaired.

Alkali-bark derivatives suitable for use in the resorcinol-formaldehyde condensate syrup of this invention may be formed by digesting a coniferous bark at a temperature of from 17° to 175° C. with an aqueous solution of a suitable alkali compound in which form 0.3 to 0.20 part of alkali compound calculated as $Na_2O$ is used to one part of dry bark. We may use as the alkali compound for reaction with the bark one of the following compounds: NaOH, KOH, $NH_4OH$, $Na_2S$, $K_2S$, and $(NH_4)_2S$, mixtures thereof, or compounds or mixtures of compounds which produce these alkali compounds in situ, such as a mixture of lime and soda ash. The foregoing alkaline compounds may be characterized in terms of "$Na_2O$ equivalent," meaning the amount thereof equivalent to $Na_2O$ as such.

We prefer to use as an alkali bark derivative the sodium bark derivative of our copending application, Serial No. 539,933, now Patent No. 2,819,295, filed Oct. 11, 1955. Briefly, such derivatives are prepared by digesting the coniferous bark in a fine state of subdivision with an aqueous ammonium solution containing from 0.02 to 1.50 part of $NH_3$ per part of dry bark at from 17° to 170° C. for from 15 to 240 minutes, reacting the extract with an aqueous solution of sodium hydroxide to form the sodium bark derivative and evaporating the solution to remove all free ammonia.

In all cases, the extract to be used in the adhesive formulations of the invention should contain a ratio of NaOH (or NaOH equivalent) to the net extract which is as low as is consistent with solubility. In no case should it ever go over 0.2, and it is preferable if it is kept down to say 0.1, or maybe even a little lower. Some NaOH or other alkali, however, must be present or the resin will not set up satisfactorily.

The coniferous trees having barks suitable for use in the invention include, western hemlock (*Tsuga heterophylla*), Douglas fir (*Pseudotsuga menziesii*), Sitka spruce (*Picea sitchensis*), white fir (*Abies amabilis*) and southern yellow pine (*Pinus echinata*, *Pinus palustris*, *Pinus taeda*, *Pinus caribaea*, *Pinus elliotti* and *Pinus rigida* var. *serotina*). In general, coniferous trees are suitable but deciduous trees are not.

The barks of different species of trees differ very greatly in their content of alkali-reactive material, presumably containing phenolic groups, which are reactive with formaldehyde. The following tests have been devised to measure the formaldehyde reactivity of the bark derivatives of various trees and duplicate tests were run to compare the reactivity of bark extracts obtained by digesting the bark with sodium hydroxide solutions and aqueous ammonia solutions.

In a 500 ml. beaker, an accurately weighed sample (about 20 g.) of the bark derivative and approximately 300 ml. of water are well mixed. The pH of the solution is adjusted to 9.5 by adding dropwise 5–10% sodium hydroxide or hydrochloric acid as required. The solution is then washed into a 500 ml. volumetric flask and 25 ml. of 37% formaldehyde is added, water is then added to make 500 ml.

A blank determination is made by adding 25 ml. of 37% formaldehyde to a 500 ml. volumetric flask and diluting to volume with water. Five ml. of this solution is added to 50 ml. of water and 10 ml. of 10% sodium sulfite solution. This solution is titrated to pH 9.5 with 0.1 N hydrochloric acid. The reaction is as follows:

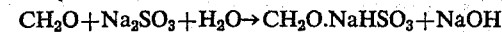

$CH_2O + Na_2SO_3 + H_2O \rightarrow CH_2O \cdot NaHSO_3 + NaOH$

From this titration is calculated the initial formaldehyde concentration.

After four hours, a 5 ml. sample of the original solution is withdrawn, diluted with 50 ml. of water and adjusted to pH 7 with 0.1 N hydrochloric acid. To this solution is added 10 ml. of 10% sodium sulfite and it is then titrated with 0.1 N hydrochloric acid to pH 9.5. From this value is calculated the amount of formaldehyde remaining after four hours.

The formaldehyde which has condensed with the bark is determined by subtracting the formaldehyde found in the four hour sample from that found in the blank. This is expressed as grams of formaldehyde per 100 g. of dry, ash-free bark material.

The above method of determining formaldehyde was described by Lemme, Chem. Ztg. 27, 896 (1903).

The ammonia extracts have approximately the same formaldehyde reactivity as the sodium hydroxide extracts. Since $NH_3$ has a formaldehyde reactivity by this test, a correction has been made for the free $NH_3$ present in the extract. This correction is as follows:

$$\text{Percent } CH_2O = \frac{30 \times 1.5x}{14} = 3.21x$$

where $x$=percent non-combined nitrogen. This value is subtracted from the value obtained by the foregoing procedure. The following table lists formaldehyde reactivities of representative bark derivative extracts made with aqueous solutions of sodium hydroxide and ammonia and measured by the foregoing test.

FORMALDEHYDE REACTIVITIES

| Species | Sodium substituted $NH_3$ extract | NaOH extract, $Na_2O$/bark [1] | $Na_2S$ extract, $Na_2O$/bark [2] |
|---|---|---|---|
| Western hemlock | 8.4 | 7.4 | 9.8 |
| Douglas fir | 6.4 | 7.2 | 7.4 |
| Sitka spruce | 6.0 | 6.0 | 8.4 |
| White fir | 6.6 | 6.6 | 6.8 |
| Southern yellow pine | 6.0 | 6.0 | |

[1] Means the $Na_2O$ weight equivalent of NaOH.
[2] Means the $Na_2O$ weight equivalent of $Na_2S$.

The NaOH and $Na_2S$ digestions were for 2 hours at 97° C. and 150° C., respectively. Because of the formaldehyde reactivity of the alkali bark derivative, no free formaldehyde should be present in the condensate syrup when the alkali bark extract is added thereto. If there is, the derivative will react rapidly with it and the syrup will become too viscous to be usable. In other words, under no circumstances can the adhesive base be prepared by merely reacting a mixture of resorcinol and bark derivative with formaldehyde. Instead, the resorcinol must first be reacted with the formaldehyde in a mole ratio of not over 0.5 to 0.8 mole formaldehyde per mole of phenolic material and then, after this mixture has condensed, the alkali bark derivative is added. As a result, of course, the mole ratio of the formaldehyde to total phenolic material in the bark derivative containing adhesive base will be lower than 0.5 to 0.8 to 1. The deficiency in formaldehyde is made up by use of additional hardener (paraformaldehyde) when the adhesive is prepared for use.

The invention will be described more in detail with reference to the examples which set forth specific illustrative embodiments of the alkali bark derivatives, the resorcinol-formaldehyde and alkali bark derivative adhesive base and the cold-setting adhesive resin, and the use of the cold-setting adhesive resin in the adhesive bonding of plywood.

The preparation of alkali bark derivatives is illustrated by the following examples:

Example 1

Western hemlock bark was hogged to sizes not larger than that which will pass a screen of about 2 meshes to the inch. To a quantity of moist bark, corresponding to 100 parts of dry bark, was added a sodium hydroxide solution containing 6.5 parts of sodium hydroxide and water to make a total of 670 parts. The charge was heated to 97° C. with stirring and was held at this temperature for two hours, at which time the reaction was substantially complete. The resulting reaction mixture was drained on a screen of about 60 x 40 meshes to the inch, and the residue was compressed to remove the solution of alkali bark derivative thus produced. The resulting solution was clarified and spray dried. The dried derivative was water soluble and the gross yield was 37.2 parts of dry powder per 100 parts of dry bark.

Example 2

An autoclave equipped with mechanical agitator was charged with a quantity of western hemlock bark corresponding to 100 parts of dry bark, 6.3 parts of sodium sulfide and water to make a total of 670 parts. The mixture was heated to 150° C. over a period of 1 hour and 40 minutes and agitated at that temperature for 2 hours. The bark product was isolated as in Example 1. The dried material was water soluble and the gross yield was 46.6 parts of dry powder per 100 parts of dry bark.

Example 3

Western hemlock bark was hogged to sizes not larger than that which will pass a screen of about 2 meshes to the inch. An autoclave equipped with mechanical agitator was charged with a quantity of the hogged bark corresponding to 100 parts of dry bark, aqueous ammonia corresponding to 10 parts of anhydrous ammonia and water to make a total charge of 670 parts. The autoclave was heated rapidly to 150° C. and held at that temperature with agitation for 30 minutes. The reaction mixture was then discharged and pressed through a 200 mesh screen to remove solid particles. The extract was analyzed and found to contain 26.4 parts of dissolved solids. 5.28 parts in solution of sodium hydroxide was then added (corresponding to 20% the weight of dry solids) and the solution was vacuum concentrated to 25% solids. The solution was then spray-dried to form a fine, dark colored, free-flowing powder. The gross yield was 31.7 parts. The proportion of sodium hydroxide to bark extract solids is not critical except as it applies to the properties of resin made from the extract. The ratio of sodium hydroxide to bark extract solid may be varied from 5 to 25%. The preferred conditions for the ammonia extractions are 100 to 150° C. for 30 minutes to one hour and with ammonia to bark ratio of 5 to 20%.

The sodium substituted ammonia bark derivatives are the most effective of the alkali bark derivatives. However, it is important that all free ammonia be removed, and to this end, it is effective to spray dry the ammonia extract or the sodium substituted bark derivative to remove the ammonia during evaporation.

Similar extracts were made from the various coniferous barks aforementioned. Likewise, extracts were prepared in which the ratio of ammonia to bark was varied over the range of 2 to 40 percent and the extraction was carried out at temperatures up to 160° C. All of these extracts were suitable for use in preparing the adhesive bases and cold-setting adhesive resins of this invention.

The following is an example of the preparation of a resorcinol-formaldehyde condensate for forming the adhesive base.

Example 4

A suitable vessel equipped with mechanical agitator and jacket for heating and cooling was charged with 750 parts of technical grade resorcinol, 150 parts of water and 150 parts of 37% formaldehyde solution. The mixture was stirred and heated at reflux temperature for 15 minutes. Two-hundred twenty-five parts of 37% formaldehyde solution was then added gradually over a period of five minutes at reflux temperature and refluxing and stirring was continued for an additional 25 minutes. The solution was then cooled. It contained 65% solids and had a pH of 3.4 and a viscosity of 7.5 poises. The molar ratio of formaldehyde to resorcinol in this example is 0.69. For the purpose of this invention resorcinol-formaldehyde condensates having a formaldehyde to resorcinol mole ratio of 0.5 to 0.8 are suitable.

The following are examples of the preparation of cold-setting adhesives of the invention:

Example 5

The alkaline bark extract of Example 1 was mixed with the resorcinol-formaldehyde condensate of Example 4 to give a 50% solution, and a mixture of paraformaldehyde and Furafil (ground corn cobs) was added at time of test as a setting agent. The resulting mixture was applied to Douglas fir veneer at a spread of 55 lbs. per thousand square feet of double glue line. The three-ply panels were pressed at room temperature at 175 p.s.i. for 18 hours. After standing 5 days the panels were subjected to a standard boil test as specified by Commercial Standards CS–45–55 for exterior type plywood, the results of which are shown in Table I.

of the above solution. This mixture was stable for 30 minutes and was used to prepare Douglas fir plywood as in Example 6. Shear specimens of this plywood showed an average shear strength of 144 p.s.i. and 85% wood failure after the exterior-type plywood boiling water test.

The adhesives prepared from the resins of the invention can be further improved by inclusion therein of the dicarboxylic acid and multiple solvent systems that are the invention of Drs. Conca, Beelik and Herrick as disclosed in copending application Serial No. 118,277, filed June 6, 1961. Such improvement is of particular importance in commercial timber laminating where it is not always possible to assemble and apply full pressure to the laminae immediately after spreading the adhesive. This is especially true, for example, when preparing curved arches or other irregular shaped pieces.

TABLE I

| Resorcinol-formaldehyde soln., g. (65% total solids) | Bark extract solids, g. | Ratio RF to bark | Water, g. | $(CH_2O)_x$, g. | Furafil, g. | Boil test | |
|---|---|---|---|---|---|---|---|
| | | | | | | Shear strength, p.s.i. | Wood failure, percent |
| 80 | 11.65 | 4 | 29.0 | 10.9 | 11.3 | 201 | 88 |
| 100 | 29.1 | 2 | 50.9 | 15.2 | 16.9 | 121 | 87 |
| 50 | 21.8 | 1.33 | 33.8 | 9.3 | 11.6 | 106 | 89 |
| 50 | 29.1 | 1 | 39.5 | 9.1 | 11.2 | 127 | 63 |

Example 6

Solutions of sodium bark derivatives prepared as in Example 3 and the resorcinol-formaldehyde condensate of Example 4 were formulated as shown in Table II. The total solvent in each case was composed of a one to one mixture of methanol and water. Paraformaldehyde as a setting agent and Furafil as a filler were added to the solution immediately prior to use of the adhesive mixture. Plywood tests were made as in Example 5. All mixtures were applied to Douglas fir veneer at a spread of 100 lbs. per thousand square feet of double glue line. Tests on these adhesives are shown in Table II.

Example 8

Four liquid resin formulations were prepared using a high speed blender and pot-life or stability tests run thereon. Routine bonding strength determinations were also run on the formulations using two ply parallel laminates of kiln dried vertical grain Douglas fir boards either 1 x 10 inch or 1 x 12 inch that were sawn to give pieces 8 inches long in the grain direction. The boards were sanded just before use and spread with a known amount of adhesive by weighing the desired amount of adhesive onto the board and spreading it with a rubber roller that was equilibrated with said adhesive. After 20 minutes' as-

TABLE II

| Adhesive base solution | | | | | | | | Viscosity, poises at 25° C. | Setting agent (44.5% paraformaldehyde, 55.5% Furafil[1]), wt., g. | Stability [2] of adhesive mix, min. | Plywood boil test | |
|---|---|---|---|---|---|---|---|---|---|---|---|---|
| Bark extract | | Resorcinol-formaldehyde condensate | | NaOH | | Solvent | | | | | | |
| Ratio, $NH_3$ to bark | Wt., g. | Ratio to bark, ext. +NaOH | Wt. of 65% T.S. Soln., g. | Ratio, to bark Ext. | Wt., g. | Water, wt., g. | Methanol, wt., g. | | | | Wet shear strength, p.s.i. | Percent wood failure |
| 0.15 | 36.9 | 1.0 | 65.0 | 0.2 | 7.4 | 44.1 | 23.8 | 54.0 | 30.9 | 25 | 174 | 86 |
| 0.15 | 196.5 | 1.0 | 286.0 | 0.1 | 20.0 | 208.0 | 300.0 | 6.5 | 152.0 | 240 | 218 | 88 |
| 0.02 | 82.0 | 1.0 | 150.0 | 0.2 | 16.8 | 94.8 | 151.0 | 35.0 | 75.0 | 30 | 184 | 85 |
| 0.02 | 91.0 | 1.0 | 150.0 | 0.1 | 9.1 | 99.0 | 151.0 | 13.5 | 75.0 | 60 | 180 | 85 |
| 0.20 | 91.0 | 1.0 | 150.0 | 0.1 | 9.1 | 99.0 | 151.0 | 70.5 | 75.0 | 60 | 159 | 96 |
| 0.15 | 104.0 | 0.5 | 91.5 | 0.2 | 21.0 | 141.0 | 93.0 | 100.0 | 67.6 | 15 | 126 | 72 |

[1] Furafil=ground corn cob residues from furfural manufacture, Quaker Oats Co.
[2] Stability=Pot life or time required for adhesive mix to gel or become unspreadable.

Example 7

One hundred and fifty parts of a resorcinol-formaldehyde resin condensate, prepared as described in Example 4, was mixed with 89.4 parts of a spray dried ammonia extract of southern pine bark containing 6.7% $H_2O$ (0.15 $NH_3$:bark, 30 minutes' extraction time at 150° C.), 22 parts of 50% sodium hydroxide solution, 76 parts of water and 151 parts of methanol. The resulting solution was found to contain 39.4% resin solids and had a pH of 9.4 and a viscosity of 2.2 poises at 25° C.

Fifteen parts of a hardener containing 44% paraformaldehyde and 56% furafil filler was added to 100 parts sembly time the boards were placed in a hydraulic press under 175 p.s.i. pressure and left overnight. Routine wet and dry breaking tests were then run on the cured laminates, each test in the following table representing the average value for 10 such breaks.

The adhesive formulations were prepared by adding 80.3 grams (75 g. bone-dry weight) of the bark extract of Example 3 to a stirred mixture of 78 mls. ethylene glycol (87 g.) and 37 mls. acetone (9 g.). To this mixture there was added in order 168.7 mls. of 1% aqueous CMC solution (Hercules 7–HP), 135 grams (75 g. solids) of either the resorcinol-formaldehyde condensate of Example 4 or Resorsabond 2621 (a commercial resorcinol-formaldehyde resin put out by American-Marietta Corporation) and if indicated 7.5 grams of maleic anhydride. These components were then mixed at the rate of 100 grams of liquid resin to 12 grams hardener-filler to form adhesives with a total solids content of 30%. (The hardener-filler was prepared by thoroughly mixing 200 g. paraformaldehyde and 250 g. of walnut shell flour.) The results obtained are set out in Table III. Relevant military specifications call for a minimum wood failure of at least 75 percent and all tests were satisfactory.

TABLE III

| R-F resin added to bark extract | Adhesive maleic acid | Composition viscosity, poises | Pot-life, hrs. at 20° C. | Bonding strength (p.s.i./percent wood failure) | |
|---|---|---|---|---|---|
| | | | | Dry | Wet |
| From Example 3. | No | 4.0 | 2.0 | 1,388/89 | 855/90 |
| Do | Yes | 3.5 | 6.0 | 1,236/95 | 693/94 |
| Resorsabond 2621. | No | 4.2 | 1.5 | 1,053/87 | 841/96 |
| Do | Yes | 3.6 | 4.0 | 1,496/92 | 632/100 |

In addition to the economic advantage of using the alkali bark derivative, it exercises an important control over the viscosity of the condensate, the derivative acting as an automatic "viscolizer." The "shelf life" of the adhesive base containing the alkali bark derivative is not affected to any noticeable extent, the adhesive base remaining in usable condition for many months when kept in sealed containers.

The invention contemplates drying the adhesive base as in a spray-dryer. In one aspect of the invention, the resorcinol-formaldehyde syrup can be spray dried and then mixed with a spray-dried alkali bark derivative to form a dry adhesive base. In another aspect of the invention a mixture of the resorcinol-formaldehyde syrup and a liquid alkali bark derivative may be spray dried at the same time.

This application is a continuation-in-part of application Serial No. 547,823, filed November 18, 1955, now abandoned, and application Serial No. 605,725, filed August 23, 1956, now U.S. Patent 3,025,250.

We claim:

1. An adhesive base for a cold-setting adhesive comprising a preformed resorcinol-formaldehyde condensate in which the mole ratio of formaldehyde to resorcinol is from 0.5 to 0.8 and added thereto an alkali bark derivative derived from a coniferous bark which was digested in an aqueous solution at a temperature of from 17° to 175° C. with an alkaline compound formed of an alkali cation of the group consisting of sodium, potassium and ammonium in the proportion of from 0.03 to 0.2 part of $Na_2O$ equivalent per part of bark until the alkali was substantially all consumed, and the alkali bark derivative was separated from the bark residue, said bark derivative having a formaldehyde reactivity of at least 5%, the ratio of the resorcinol-formaldehyde to alkali bark derivative being from 0.5 to 4.

2. An adhesive base for a cold-setting adhesive comprising a preformed resorcinol-formaldehyde condensate in which the mole ratio of formaldehyde to resorcinol is from 0.5 to 0.8 and added thereto an alkali bark derivative derived from a coniferous bark obtained by digesting the bark in an aqueous solution of an alkali compound in the proportion of from 0.03 to 0.2 part of $Na_2O$ equivalent per part of dry bark at a temperature of from 17° to 175° C., said alkali bark product having a formaldehyde reactivity of at least 5%, the ratio of the resorcinol-formaldehyde to the bark derivative being from 0.5 to 4.

3. An adhesive base for a cold-setting adhesive comprising a preformed resorcinol-formaldehyde condensate in which the mole ratio of formaldehyde to resorcinol is from 0.5 to 0.8 and added thereto an alkali bark derivative derived from a coniferous bark obtained by digesting the bark in an aqueous ammonia solution containing from 0.02 to 1.5 part of ammonia per part of dry bark at an elevated temperature of from 17° to 175° C., then drying the resulting extract and removing the free ammonia, and reacting the dried extract with an aqueous solution of sodium hydroxide to form the sodium substituted bark derivative, said ratio of the resorcinol-formaldehyde to alkali bark derivative being from 0.5 to 4.

4. A cold-setting adhesive which comprises an adhesive base including a preformed resorcinol and formaldehyde condensate in which the mole ratio of formaldehyde to resorcinol is from 0.5 to 0.8 and added thereto an alkali bark derivative of a coniferous bark obtained by digesting said bark in an aqueous solution at a temperature of from 17° to 175° C. with an alkaline compound formed of an alkali cation of the group consisting of sodium, potassium and ammonium in the proportion of from 0.03 to 0.2 part of $Na_2O$ equivalent per part of bark until the alkali was substantially all consumed, and the alkali bark derivative was separated from the bark residue, said bark derivative having a formaldehyde reactivity of at least 5%, the ratio of the resorcinol-formaldehyde to bark derivative from 1 to 4 and further added thereto sufficient paraformaldehyde to set the resorcinol and alkali bark derivative to a water-insoluble resin when cold and under a low pressure.

5. An adhesive as defined in claim 4 in which the alkali bark derivative is a sodium substituted bark derivative formed by reacting a dry aqueous ammonia extract of a coniferous bark with sodium hydroxide in aqueous solution.

References Cited by the Examiner

UNITED STATES PATENTS

| Re. 23,347 | 3/1951 | Redfern | 260—57 |
| 2,490,927 | 12/1949 | Spahr et al. | 260—17.2 |
| 2,549,142 | 4/1951 | Thompson | 252—8.5 |
| 2,574,785 | 11/1951 | Heritage | 260—17.2 |
| 2,675,336 | 4/1954 | Stephen | 260—29.3 |
| 2,773,847 | 12/1956 | Pauley | 260—17.2 |

JOSEPH L. SCHOFER, *Primary Examiner.*

D. ARNOLD, LEON J. BERCOVITZ, *Examiners.*

UNITED STATES PATENT OFFICE
CERTIFICATE OF CORRECTION

Patent No. 3,232,897                                February 1, 1966

Franklin W. Herrick et al.

It is hereby certified that error appears in the above numbered patent requiring correction and that the said Letters Patent should read as corrected below.

Column 1, line 61, for "as" read -- has --; line 71, for "form 0.3" read -- from 0.03 --; column 2, line 15, for "ammonium" read -- ammonia --; column 6, line 11, for "June 6, 1961" read -- June 20, 1961 --.

Signed and sealed this 17th day of January 1967.

(SEAL)
Attest:

ERNEST W. SWIDER                                    EDWARD J. BRENNER
Attesting Officer                                        Commissioner of Patents